US012806962B2

(12) United States Patent
Nishiyama et al.

(10) Patent No.: US 12,806,962 B2
(45) Date of Patent: Nov. 24, 2026

(54) TEMPERATURE CONTROL SYSTEM

(71) Applicant: TOYOTA JIDOSHA KABUSHIKI KAISHA, Aichi-ken (JP)

(72) Inventors: Masahiro Nishiyama, Toyota (JP); Kenji Tsukagishi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 35 days.

(21) Appl. No.: 19/035,846

(22) Filed: Jan. 24, 2025

(65) Prior Publication Data

US 2025/0242660 A1 Jul. 31, 2025

(30) Foreign Application Priority Data

Jan. 30, 2024 (JP) ................................ 2024-011614

(51) Int. Cl.
*B60H 1/00* (2006.01)
*B60K 11/02* (2006.01)

(52) U.S. Cl.
CPC .......... *B60H 1/00878* (2013.01); *B60K 11/02* (2013.01)

(58) Field of Classification Search
CPC .... B60H 1/00878; B60K 11/02; B60K 11/06; B60K 1/00; B60K 11/04
See application file for complete search history.

(56) References Cited

U.S. PATENT DOCUMENTS

2011/0066310 A1* 3/2011 Sakai ........................ B60L 7/16 701/22
2014/0331693 A1 11/2014 Meitinger et al.
2017/0361698 A1* 12/2017 Hussain .................... F01P 5/06
2020/0215871 A1 7/2020 Tomita et al.
2022/0289072 A1* 9/2022 Jeon ........................ B60L 58/12
2025/0121739 A1* 4/2025 Wang ................ H01M 8/04358

FOREIGN PATENT DOCUMENTS

JP 2010-169428 A 8/2010
JP 2020-111084 A 7/2020

* cited by examiner

*Primary Examiner* — Toya Pettiegrew
(74) *Attorney, Agent, or Firm* — HAUPTMAN HAM, LLP

(57) ABSTRACT

The temperature control system mounted on a vehicle, the temperature control system comprises a temperature control device configured to cool and control the temperature of a target in-vehicle device that generates heat as a vehicle travels; and a temperature controller that controls driving of the temperature control device, wherein the temperature controller is configured to increase a cooling capability of the temperature control device when a special mode, in which a travel performance is prioritized over a fuel consumption, is set, as compared with a case where the special mode is not set, and the temperature controller is configured to permit setting of the special mode only when the vehicle is in a special area which is predefined.

5 Claims, 5 Drawing Sheets

| | CMP | FAN | W/P |
|---|---|---|---|
| A COURSE WITH A LONG STRAIGHT PORTION | LARGE | SMALL/MIDDLE | LARGE |
| A COURSE HAVING A LARGE NUMBER OF CORNERS | LARGE | LARGE | LARGE |
| RAINY WEATHER | SMALL/MIDDLE | SMALL/MIDDLE | SMALL/MIDDLE |

FIG. 4

| | | CMP | FAN | W/P | RAINY WEATHER |
|---|---|---|---|---|---|
| L1 | CIRCUIT A | MIDDLE | SMALL | MIDDLE | −10% |
| L2 | CIRCUIT B | LARGE | LARGE | LARGE | −10% |
| L3 | CIRCUIT C | MIDDLE | MIDDLE | MIDDLE | −10% |

FIG. 5

TEMPERATURE CONTROL SYSTEM

CROSS REFERENCE TO RELATED APPLICATION

This application claims priority to Japanese Patent Application No. 2024-011614 filed on Jan. 30, 2024, which is incorporated herein by reference in its entirety including the specification, claims, drawings, and abstract.

TECHNICAL FIELD

This specification discloses a temperature control system that is mounted on a vehicle and controls a temperature of a target in-vehicle device that generates heat as the vehicle travels.

BACKGROUND

There is an in-vehicle device (hereinafter referred to as a "target in-vehicle device") that generates heat as the vehicle travels. For example, in the case of an electric vehicle, a traveling motor, a battery that supplies electric power to the traveling motor, and a power control unit (hereinafter, referred to as a "PCU") that controls the output of electric power generate heat as the vehicle travels. When the temperature of the target in-vehicle device becomes excessively high, the vehicle cannot travel properly. Therefore, a temperature control system for controlling the temperature of these target in-vehicle devices has been proposed.

For example, Patent Document 1 discloses a cooling system for cooling a battery of a vehicle. In Patent Document 1, the flow path form of the refrigeration cycle circuit is switched to actively cool the target in-vehicle device at the timing when the sports traveling mode is selected assuming high-speed traveling on the circuit.

Here, when a special mode such as a sport traveling mode is selected as in Patent Document 1, various limiters set in the vehicle are released, and high-speed traveling becomes possible. It also improves the cooling capability of the temperature control system. Such the special mode is set in a special area (for example, a circuit or the like) in which high-speed traveling is originally permitted.

However, in the case of the technique of Patent Document 1, there is a possibility that the user erroneously sets the special mode in the area other than the special area. In this case, the cooling capacity of the temperature control system is improved even though the vehicle does not travel at high speed, which leads to an increase in power consumption.

Therefore, this specification discloses an in-vehicle temperature control system capable of preventing an increase in power consumption due to erroneous setting of a special mode.

CITATION LIST

PATENT DOCUMENT 1: JP.2020-111084.A

SUMMARY

An in-vehicle temperature control system disclosed in this specification comprises: a temperature control device configured to cool and control the temperature of a target in-vehicle device that generates heat as a vehicle travels; and a temperature controller that controls driving of the temperature control device, wherein the temperature controller is configured to increase a cooling capability of the temperature control device when a special mode, in which a travel performance is prioritized over a fuel consumption, is set, as compared with a case where the special mode is not set, and the temperature controller is configured to permit setting of the special mode only when the vehicle is in a special area which is predefined.

With this configuration, it is possible to prevent erroneous setting of the special mode, and thus it is possible to prevent an increase in power consumption due to the erroneous setting.

In this case, the special mode may be a mode for traveling on a course of a circuit, the special area may be an area including the circuit, and the temperature controller may be configured to change a control parameter of the temperature control device depending on the course or the circuit in which the vehicle is located.

In addition, the temperature control device may include a compressor, a radiator fan, and a water pump, and the temperature controller may be configured to: change control parameters of the compressor and the water pump in a manner to increase the cooling capability in a case in which the vehicle travels on a course with a long straight portion as compared with a case in which the vehicle travels on a course with a short straight portion; change control parameters of the compressor, the radiator fan, and the water pump in a manner to increase the cooling capability, in a case in which the vehicle travels on a course having a large number of corners, as compared with a case in which the vehicle travels on a course having a small number of corners; and reduce a change ratio of the control parameters of the compressor, the radiator fan, and the water pump in rainy weather as compared with in fine weather.

With this configuration, it is possible to control the temperature according to the characteristics of the circuit and the course.

The temperature controller may be configured to display map information indicating the special area on the an in-vehicle display.

With this configuration, the user can easily recognize whether or not to set the special mode.

The temperature controller may be configured to cancel the special mode when the vehicle moves out of the special area in a state in which the special mode is set.

This configuration prevents the special mode from being erroneously continued. Thus, wasteful power consumption can be effectively prevented.

According to the in-vehicle temperature control system disclosed in this specification, since erroneous setting of the special mode is effectively prevented, it is possible to prevent an unnecessary increase in power required for temperature control.

BRIEF DESCRIPTION OF DRAWINGS

Embodiment(s) of the present disclosure will be described based on the following figures, wherein:

FIG. 4 is a diagram showing a correspondence relationship between a change rate of a temperature control parameter and a feature of a course and weather; and FIG. 5 is a map showing a correspondence relationship between a change rate of a temperature control parameter and a location of a vehicle.

DESCRIPTION OF EMBODIMENT

Figure 1:
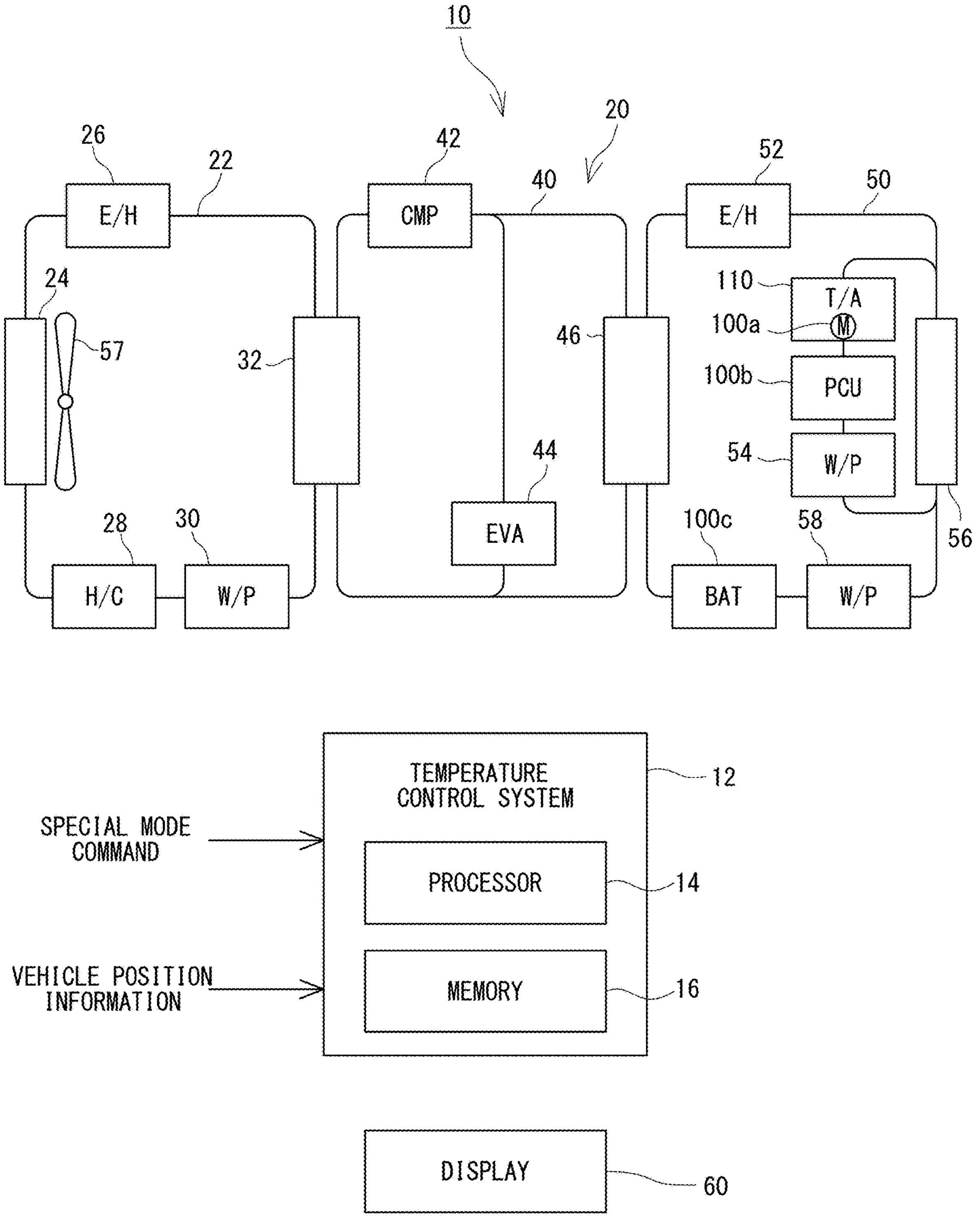
FIG. 1 is a block diagram showing a configuration of a temperature control system.

Hereinafter, a configuration of the in-vehicle temperature control system 10 will be described with reference to the drawings. FIG. 1 is a block diagram showing a configuration of a temperature control system 10. The temperature control system 10 is mounted on a vehicle, and adjusts the temperature of some in-vehicle devices (hereinafter referred to as "target in-vehicle devices 100"). The type of the vehicle on which the temperature control system 10 is mounted is not particularly limited. Therefore, the vehicle on which the temperature control system 10 is mounted may be any of a battery electric vehicle, a hybrid electric vehicle, a fuel cell electric vehicle, and an engine vehicle. Hereinafter, a temperature control system 10 mounted on a battery electric vehicle will be described as an example.

The temperature control system 10 includes a temperature control device 20 and a temperature controller 12. The temperature control device 20 is a device that cools and controls the temperature of the target in-vehicle device 100. Here, the target in-vehicle device 100 is a device that generates heat as the vehicle travels. For example, the traveling motor 100*a*, the PCU 100*b*, and the battery 100*c* correspond to a target in-vehicle device. Hereinafter, when the traveling motor 100*a*, the PCU 100*b*, and the battery 100*c* are not distinguished from each other, they are collectively referred to as a "target in-vehicle device 100". The traveling motor 100*a* is a motor generator that outputs traveling power and generates electric power by braking force. The traveling motor 100*a* is unitized with a transmission (not shown), and constitutes a transaxle 110. The battery 100*c* is a rechargeable secondary battery. Electric power is supplied from the battery 100*c* to the traveling motor 100*a*, and the electric power generated by the traveling motor 100*a* is charged to the battery 100*c*. The PCU 100*b* includes an inverter that drives the traveling motor 100*a*, a DC-DC converter that performs voltage conversion, and the like. The PCU 100*b* controls electric power supplied to the traveling motor 100*a*.

The temperature control device 20 cools and controls the temperature of the target in-vehicle device 100 as necessary. The temperature control device 20 includes a high-temperature cooling circuit 22, a refrigerant circuit 40, and a low-temperature cooling circuit 50. The high-temperature cooling circuit 22 circulates cooling water as a heat medium. The high-temperature cooling circuit 22 includes a heater core 28, an electric heater 26, a radiator 24, a water pump 30, and a radiator fan 57. The water pump 30 pumps and circulates the cooling water. The electric heater 26 heats the cooling water. The heated cooling water exchanges heat with the surrounding air in the heater core 28. By blowing the heated air into the vehicle, the vehicle interior is heated.

The radiator 24 air-cools the cooling water output from the heater core 28. The radiator 24 is arranged side by side with a radiator 56 of a low-temperature cooling circuit 50, which will be described later, in an up-down direction or a front-rear direction. The radiator fan 57 is disposed behind the radiators 24 and 56, and sucks the outside air so that the outside air flows toward the radiators 24 and 56.

The refrigerant circuit 40 circulates the refrigerant while changing its state. The refrigerant circuit 40 includes a compressor 42, an evaporator 44, and a water-cooled condenser 32. The compressor 42 compresses the refrigerant. The compressed refrigerant condenses in the water-cooled condenser 32. The condensed refrigerant is injected from an expansion valve (not shown) toward the evaporator 44 and expanded. At this time, the refrigerant is vaporized to cool the air around the evaporator 44. The air around the evaporator 44 is blown toward the inside of the vehicle, so that the inside of the vehicle is cooled. The water-cooled condenser 32 discharges the heat of the cooling circuit to the cooling water of the high-temperature cooling circuit 22.

The low-temperature cooling circuit 50 circulates cooling water as a heat medium. The low-temperature cooling circuit 50 includes a chiller 46, an electric heater 52, a radiator 56, and water pumps 54 and 58. The low-temperature cooling circuit 50 controls the temperature of the target in-vehicle device 100, that is, the traveling motor 100*a*, the PCU 100*b*, and the battery 100*c*. The electric heater 52 heats the cooling water. The electric heater 52 is turned on when the target in-vehicle device 100 is heated. When cooling the target in-vehicle device 100, the cooling water absorbs heat of the target in-vehicle device 100. The heat of the cooling water is discharged to the outside air and the refrigerant circuit 40 via the radiator 56 and the chiller 46. The water pumps 54 and 58 pump and circulate the cooling water. Although not illustrated, the temperature control device 20 further includes a sensor that directly or indirectly detects the temperature of the target in-vehicle device 100, and the detected temperature of the target in-vehicle device 100 is transmitted to the temperature controller 12.

The temperature controller 12 controls driving of the temperature control device 20. The temperature controller 12 is physically a computer having a processor 14 and a memory 16. In FIG. 1, the temperature controller 12 is illustrated as a single computer. However, the temperature controller 12 may be configured by combining a plurality of computers physically separated from each other.

The temperature controller 12 controls driving of the temperature control device 20 based on the detected temperature of the target in-vehicle device 100. For example, the temperature controller 12 increases the outputs of the compressor 42, the water pumps 30, 54, and 58, and the radiator fan 57 as the detected temperature of the target in-vehicle device 100 increases and the required cooling amount increases. As a result, the target in-vehicle device 100 is cooled more quickly. In addition, the temperature controller 12 changes a control parameter (hereinafter, referred to as a "temperature control parameter") of the temperature control device 20 so that the cooling capacity of the target in-vehicle device 100 is improved when the special mode described later is enabled as compared with when the special mode is disabled.

Next, the special travel and the special mode will be described. The special traveling is a traveling mode in which the traveling performance is more important than the fuel efficiency, the comfort, and the like. For example, course traveling on a circuit corresponds to "special traveling". The special mode is a mode for performing the special traveling.

When the special traveling is performed, the load on the target in-vehicle device 100 increases, and the heat generation amount of the target in-vehicle device 100 increases. Therefore, the temperature controller 12 changes the temperature control parameter so that the cooling capability is improved when the special mode is enabled as compared with when the special mode is disabled. The temperature control parameter is, for example, a limit threshold value of the output of the electric device for temperature control, or a start or target temperature of cooling.

This will be specifically described. Normally, the temperature controller 12 suppresses the output limit threshold value of the compressor 42, the water pumps 30, 54, and 58, and the radiator fan 57 (hereinafter, collectively referred to as "electric equipment for temperature control") to be equal to or less than a predetermined standard limit threshold value P1 in consideration of fuel consumption, quietness, and the like. Specifically, the standard limit threshold value P1 is, for example, a power upper limit value or a rotation speed upper limit value.

Normally, when the detected temperature Td of the target in-vehicle device 100 is higher than the standard temperature control start temperature Ts1, the temperature controller 12 starts cooling the target in-vehicle device 100. This cooling is continued until the detected temperature Td becomes equal to or lower than the standard temperature control target temperature Tt1.

When the special mode is enabled, the temperature controller 12 changes the limit threshold value of the output of the electric equipment for temperature control to a special limit threshold value P2 higher than the standard limit threshold value P1. As a result, the cooling capability of the temperature control device 20 is improved although the fuel economy and noise are deteriorated, so that the target in-vehicle device 100 can be rapidly cooled. As a result, it is possible to prevent the temperature of the target in-vehicle device 100 from reaching the limit temperature even when the amount of heat generated by the target in-vehicle device 100 increases due to high-speed traveling.

When the special mode is set, the temperature controller 12 lowers the cooling start temperature and the cooling target temperature as compared with the case where the special mode is disabled. That is, when the special mode is set, the temperature controller 12 starts cooling when the detected temperature Td is higher than the special temperature control start temperature Ts2 ($Ts2<Ts1$), and ends cooling when the detected temperature Td reaches the special temperature control target temperature Tt2 ($Tt2<Tt1$). Accordingly, since the cooling of the target in-vehicle device 100 is performed early and for a long period of time, overheating of the target in-vehicle device 100 during high-speed traveling is prevented.

Here, when such a special mode is set, the target in-vehicle device 100 is more actively cooled, while power consumption increases. When high-speed traveling is performed, such an increase in power consumption is allowed. However, if the special mode is erroneously enabled in a situation where the vehicle does not travel at high speed, there is a problem in that power consumption increases more than necessary.

Therefore, the temperature controller 12 allows the setting of the special mode only when the vehicle is in a predefined special area, and prevents erroneous setting of the special mode. The special area is an area in which special traveling is permitted. When the special travel is a course travel on a circuit, the special area is, for example, a site of the circuit. Hereinafter, this will be described in detail.

As shown in FIG. 1, a special mode command and vehicle position information are input to the temperature controller 12. The special mode command is a command input from the user to the vehicle, and is a command for instructing the start of the special mode. Essentially, this special mode command should be entered only in situations where high speed driving is permitted, i.e., only when the vehicle is located in a special area. However, a special mode command may be input outside the special area due to erroneous recognition by the user.

When the special mode command is input, the temperature controller 12 confirms the position information of the vehicle. Then, the temperature controller 12 permits the setting of the special mode only when the vehicle is located in a predetermined special area. Here, as described above, the special area is an area in which special traveling is permitted, and is, for example, a site of a circuit. The temperature controller 12 compares the special area with the position information of the vehicle. As a result, when the vehicle is located in the special area, the temperature controller 12 sets the special mode. As a result, the special temperature control for actively cooling the target in-vehicle device 100 is started. On the other hand, when the vehicle is located outside the special area, the temperature controller 12 does not set the special mode. This can prevent an excessive increase in power consumption.

The number of special areas stored in the temperature controller 12 is not limited to one, and a plurality of special areas may be stored. Further, the special area is not limited to the circuit, and may be another area as long as the special travel is possible. For example, the special area may be an outburn or a performance test area of the vehicle. The special area may be registered at the time of shipment of the vehicle, or may be additionally registered in the vehicle at any time by using a communication function. The information on the special area may be stored by the temperature controller 12 or may be stored by another system installed in the vehicle. For example, many vehicles are currently equipped with navigation systems. In addition to map information, various pieces of facility information are also registered in the navigation system. A special area may be registered as one type of facility information. In this case, the temperature controller 12 acquires the positional relationship between the current position of the vehicle and the special area by communicating with the navigation system.

Figure 2:
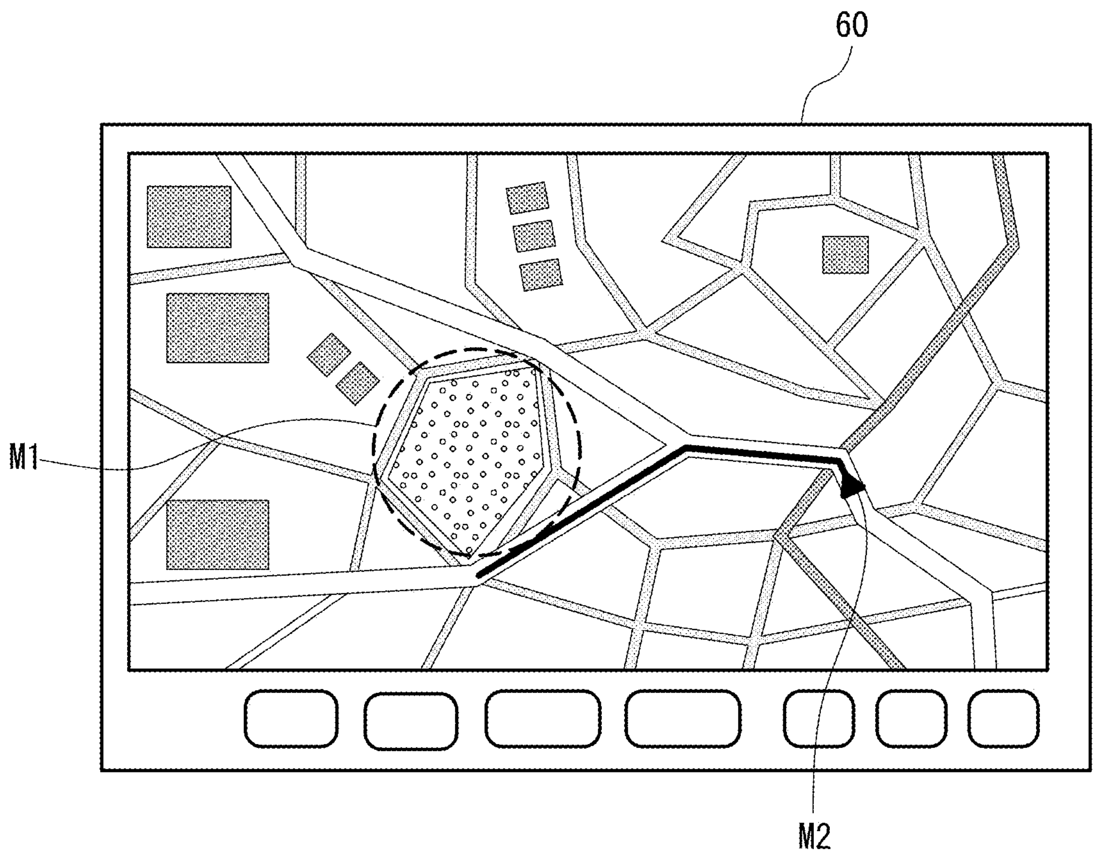
FIG. 2 is a diagram showing an example of display of a special area.

The position information of the special area may be presented to the user via the display 60. The display 60 may be, for example, an in-vehicle display that displays navigation information or audio information. FIG. 2 is a diagram showing an example of display of such a special area. In FIG. 2, a broken line mark M1 indicates a special area, and a black triangle mark M2 indicates the position of the vehicle. In the example of FIG. 2, the position information M1 of the special area is superimposed on the map for navigation. Position information M2 of the vehicle is also displayed on the map for navigation. By viewing this display, the user can easily determine whether or not to set the special mode. When a special mode command is input from the user outside the special area, the temperature controller 12 may display a message indicating that the area is outside the special area on the display 60.

Figure 3:
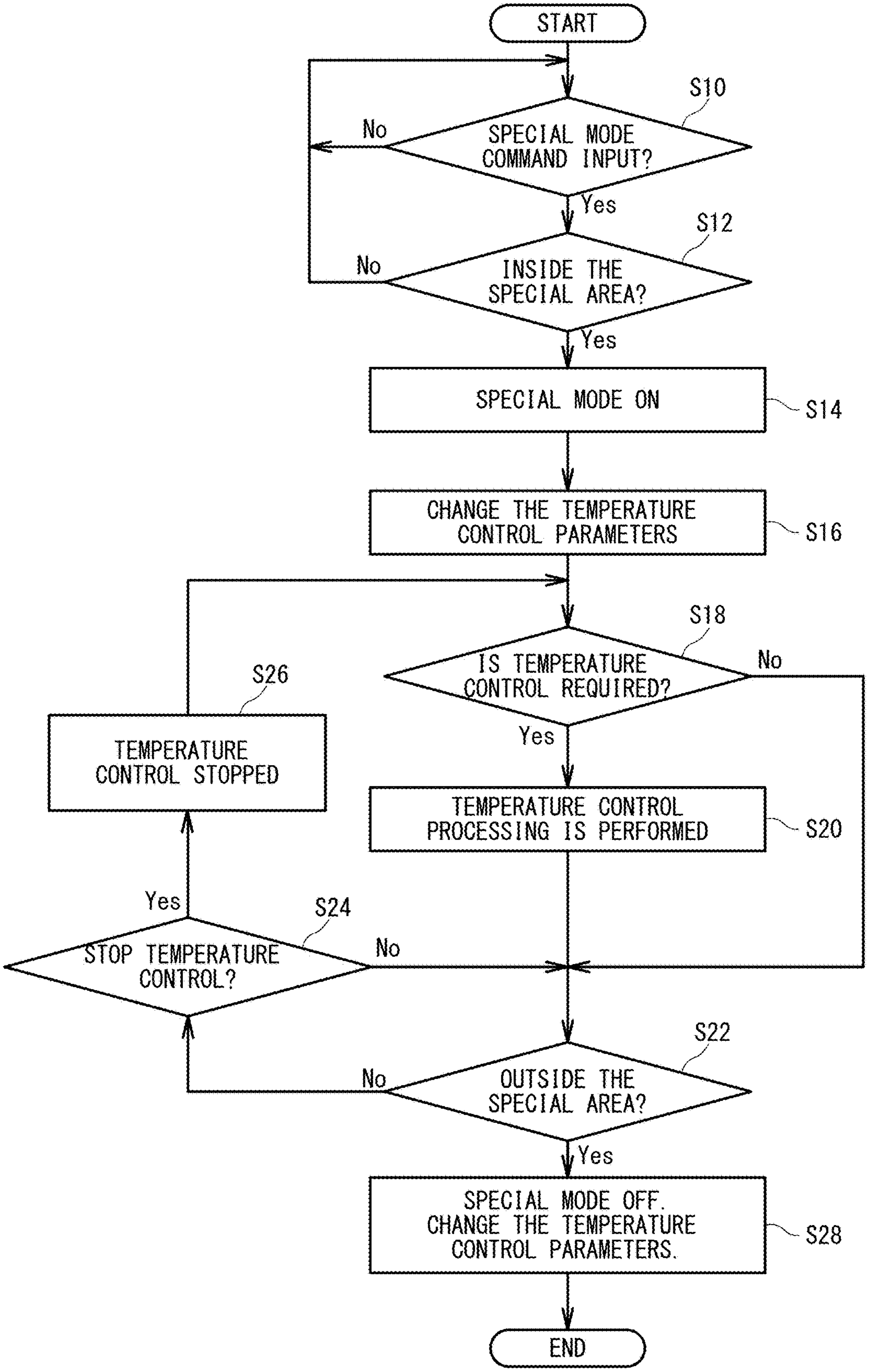
FIG. 3 is a flowchart showing a flow of processing by the temperature control system.

Next, a flow of processing by the temperature control system 10 will be described with reference to FIG. 3. As shown in FIG. 3, when the special mode command is input (Yes in S10), the temperature controller 12 checks whether or not the vehicle is in the special area (S12). When the vehicle is outside the special area (No in S12), the temperature controller 12 waits without setting the special mode.

On the other hand, when the vehicle is located in the special area (Yes in S12), the temperature controller 12 sets the special mode (S14). In this case, the temperature controller 12 changes the temperature control parameter to that for the special mode (S16). That is, the temperature controller 12 changes the limit threshold value of the electric equipment for temperature control from the standard limit threshold value P1 to the special limit threshold value P2. Further, the temperature controller 12 changes the temperature control start temperature from the standard temperature control start temperature Ts1 to the special temperature control start temperature Ts2, and changes the temperature control target temperature from the standard temperature control target temperature Tt1 to the special temperature control target temperature Tt2.

Thereafter, the temperature controller 12 determines whether or not the temperature control is necessary (S18). That is, the temperature controller 12 compares the detected temperature Td of the target in-vehicle device 100 with the special temperature control start temperature Ts2. As a result of the comparison, when Td>Ts2, the temperature controller 12 determines that temperature control is necessary, and performs temperature control processing (S20). Thereafter, the temperature controller 12 periodically checks the position of the vehicle (S22). When the vehicle is located inside the special area (No in S22), the temperature controller 12 determines whether or not the temperature control should be stopped (S24). Specifically, the temperature controller 12 compares the detected temperature Td with the special temperature control target temperature Tt2. As a result of the comparison, when Td>Tt2, the temperature controller 12 determines that the temperature control is to be continued (No in S24). On the other hand, when Td≤Tt2, the temperature controller 12 determines that the temperature control should be stopped (Yes in S24). In this case, after stopping the temperature control process (S26), the temperature controller 12 returns to step S18.

When the vehicle is located outside the special area (Yes in S22), the temperature controller 12 cancels the special mode and changes the temperature control parameter to a standard value. In this way, by automatically releasing the special mode when the vehicle exits the special area, unnecessary temperature control is suppressed. As a result, power can be prevented from being consumed more than necessary.

As is clear from the above description, according to the technology disclosed in the present specification, the setting of the special mode for actively cooling the target in-vehicle device 100 is permitted only when the vehicle is located in the special area. Therefore, even when the user erroneously instructs the special mode, it is possible to prevent power from being consumed more than necessary.

Here, as described above, when the special mode is set, the temperature controller 12 changes the temperature control parameter so that the cooling capability is improved. The change amount of the temperature control parameter may be always the same, or may be changed according to the position of the vehicle, the weather, or the like. For example, the circuit has various courses and different characteristics from each course. The required cooling capability differs depending on the characteristics of the course.

For example, consider a course in which the straight portion is long. In this case, since the vehicle can maintain a high speed for a long time, the air volume to the radiators 24 and 56 naturally increases. Therefore, the radiators 24 and 56 can be sufficiently cooled without increasing the rotational speed of the radiator fan 57. Therefore, as shown in FIG. 4, when the vehicle travels on a course in which the straight portion is long, the temperature controller 12 may suppress the change rate of the limit threshold value of the radiator fan 57 to be smaller than the change rate of the limit threshold values of the compressor 42 and the water pumps 30, 54, and 58.

In addition, in the case of a course having a large number of corners, while rapid deceleration and rapid acceleration increase, the amount of air flowing to the radiators 24 and 56 does not increase so much. Therefore, in this case, as shown in FIG. 4, the temperature controller 12 may greatly change the limit threshold values of the radiator fan 57, the compressor 42, and the water pumps 30, 54, and 58.

Further, in the case of rainy weather, the radiators 24 and 56 are wet by rain, and heat is easily dissipated. In addition, raindrops adhering to the radiators 24 and 56 vaporize, so that the temperature of the entire power unit chamber in which the radiators 24 and 56 and the target in-vehicle device 100 are disposed is likely to decrease. As a result, the target in-vehicle device 100 can be appropriately cooled without significantly relaxing the output limitation of the air-conditioning electric device. Therefore, in the case of rainy weather, the temperature controller 12 may suppress the change ratio of the restriction threshold value of each of the radiator fan 57, the compressor 42, and the water pumps 30, 54, and 58 to be smaller than that in the case of fine weather. Further, the present technology is not limited to the example shown in FIG. 4, and the change ratio of the temperature control parameter may be changed under other conditions. For example, the change ratio of the temperature control parameter may be changed according to the gradient of the course, the season, the time, the presence or absence of snowfall or freezing, or the like.

The temperature controller 12 may store a change ratio of the temperature control parameter as a map for each circuit or course. FIG. 5 is a map showing a correspondence relationship between a change rate of a temperature control parameter and a circuit; In the example of FIG. 5, the circuit A has a long straight portion and a slightly large number of corner portions. In this case, the change rate of the limit threshold value of the compressor 42 and the water pumps 30, 54, and 58 is set to “medium”, and the change rate of the limit threshold value of the radiator fan 57 is set to “small”. In the case of rainy weather, the rate of change of these limit threshold values is reduced by 10%.

Then, when the special mode is set, the temperature controller 12 specifies the circuit in which the vehicle is located, compares the specified circuit with the map of FIG. 5, and determines the change rate of the limit threshold value. For example, when the special mode is set in the circuit B, the temperature controller 12 changes the restriction threshold values of the radiator fan 57, the compressor 42, and the water pump 30 according to the second line L2 of the map.

FIG. 5 is a map for each circuit, but may be a more subdivided map. For example, the change ratio of the limit threshold value may be determined for each course instead of for each circuit. Further, as the temperature control parameter, in addition to or instead of the limit threshold value, the change ratio of the temperature control start temperature or the temperature control target temperature may be changed in accordance with the position of the vehicle. In any case, by changing the change ratio of the temperature control parameter according to the position of the vehicle, the temperature of the target in-vehicle device 100 can be controlled more efficiently.

In addition, all of the configurations described above are examples, and other configurations may be appropriately changed as long as the configuration described in claim 1 is provided. For example, in the above description, the temperature control system mounted on the battery electric vehicle has been described as an example. However, the technology disclosed in the present specification may be mounted on other types of vehicles without being limited to battery electric vehicles. Therefore, the temperature control system 10 may be mounted on an engine vehicle, a hybrid electric vehicle, or the like. In this case, the temperature control device 20 includes a cooling circuit for cooling the engine, and the electric equipment for temperature control includes a water pump for circulating the engine cooling water.

REFERENCE SIGNS LIST temperature control system, 12 temperature controller, 14 processor, 16 memory, 20 temperature control device, 22 high-temperature cooling circuit, 24 radiators, 24 radiator, 26 electric heater, 28 heater core, 30 water pump, 32 water-cooled condenser, 40 refrigerant circuit, 42 compressor, 44 evaporator, 46 chiller, 50 low-temperature cooling circuit, 52 electric heater, 54 water pumps, 56 radiator, 57 radiator fan, 60 display, 100 target in-vehicle device, 100*a* traveling motor, 100*b* PCU, 100*c* battery, 110 transaxle.

The invention claimed is:

1. A temperature control system mounted on a vehicle, the temperature control system comprising:

a temperature control device configured to cool and control the temperature of a target in-vehicle device that generates heat as a vehicle travels; and a temperature controller that controls driving of the temperature control device, wherein the temperature controller is configured to increase a cooling capability of the temperature control device when a special mode, in which a travel performance is prioritized over a fuel consumption, is set, as compared with a case where the special mode is not set, and the temperature controller is configured to permit setting of the special mode only when the vehicle is in a special area which is predefined, the special mode is a mode for traveling on a course of a circuit, the special area is an area including the circuit, and the temperature controller is configured to change a control parameter of the temperature control device depending on the course or the circuit in which the vehicle is located.

2. The temperature control system according to claim 1, wherein the temperature control device includes a compressor, a radiator fan, and a water pump, and the temperature controller is configured to:

change control parameters of the compressor and the water pump in a manner to increase the cooling capability in a case in which the vehicle travels on a course with a long straight portion as compared with a case in which the vehicle travels on a course with a short straight portion;

change control parameters of the compressor, the radiator fan, and the water pump in a manner to increase the cooling capability, in a case in which the vehicle travels on a course having a large number of corners, as compared with a case in which the vehicle travels on a course having a small number of corners; and reduce a change ratio of the control parameters of the compressor, the radiator fan, and the water pump in rainy weather as compared with in fine weather.

3. The temperature control system according to claim 1, wherein the temperature controller is configured to display map information indicating the special area on an in-vehicle display.

4. The temperature control system according to claim 1, wherein the temperature controller is configured to cancel the special mode when the vehicle moves out of the special area in a state in which the special mode is set.

5. The temperature control system according to claim 1, wherein the temperature controller is configured to set a limit threshold value of an output of electric equipment for temperature control to a higher value when the special mode is enabled than when the special mode is disabled.

* * * * *